United States Patent
Narayanan (10) Patent No.: US 7,376,838 B2
(45) Date of Patent: May 20, 2008

(54) METHOD FOR CONTROLLED AND AUDITED ACCESS TO PRIVILEGED ACCOUNTS ON COMPUTER SYSTEMS

(75) Inventor: Lakshmi Narayanan, New York, NY (US)

(73) Assignee: JP Morgan Chase Bank, New York, NY (US)

( * ) Notice: Subject to any disclaimer, the term of this patent is extended or adjusted under 35 U.S.C. 154(b) by 741 days.

(21) Appl. No.: 10/680,400

(22) Filed: Oct. 7, 2003

(65) Prior Publication Data

US 2005/0015628 A1   Jan. 20, 2005

Related U.S. Application Data

(60) Provisional application No. 60/487,995, filed on Jul. 17, 2003.

(51) Int. Cl.
 G06F 9/00 (2006.01)
 H04L 9/00 (2006.01)
(52) U.S. Cl. .................. 713/183; 713/164; 713/165; 713/193; 713/194; 726/1; 726/2; 726/3; 726/4; 726/6; 726/22; 705/40; 705/42; 705/68; 705/70; 705/75; 705/78
(58) Field of Classification Search ............ 713/193, 713/194; 726/2; 705/35
 See application file for complete search history.

(56) References Cited

U.S. PATENT DOCUMENTS

| | | | |
|---|---|---|---|
| 3,705,385 A | 12/1972 | Batz | |
| 3,860,870 A | 1/1975 | Furuya | |
| 3,896,266 A | 7/1975 | Waterbury | |
| 3,938,091 A | 2/1976 | Atalla et al. | |
| 4,013,962 A | 3/1977 | Beseke et al. | |
| 4,321,672 A | 3/1982 | Braun et al. | |
| 4,567,359 A | 1/1986 | Lockwood | |
| 4,633,397 A | 12/1986 | Macco | |
| 4,695,880 A | 9/1987 | Johnson et al. | |
| 4,696,491 A | 9/1987 | Stenger | |
| 4,713,761 A | 12/1987 | Sharpe et al. | |
| 4,725,719 A | 2/1988 | Oncken et al. | |

(Continued)

FOREIGN PATENT DOCUMENTS

CA  2430549  6/2002

(Continued)

OTHER PUBLICATIONS

Echarge, Echarge Corporation, www.echarge.com, Dec. 3, 1999.

(Continued)

*Primary Examiner*—Kambiz Zand
*Assistant Examiner*—Jenise E. Jackson
(74) *Attorney, Agent, or Firm*—Lowenstein Sandler PC (57) ABSTRACT

A method that provides access to Privileged Accounts to users with Privileged Account access permission. A message is sent to a Privileged Accounts manager when a user logs into a Privileged Account. The user must enter a reason for access. All keystrokes are logged. At the conclusion of the user session, the log file is closed and another message is sent to the Privileged Accounts manager. The log file may be sent to the manager at this time or saved for a batch transfer periodically.

8 Claims, 9 Drawing Sheets

U.S. PATENT DOCUMENTS

| | | |
|---|---|---|
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,032,979 A * | 7/1991 | Hecht et al. ............ 726/25 |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |

| | | | | | |
|---|---|---|---|---|---|
| 5,828,751 A | 10/1998 | Walker et al. | 5,956,695 A | 9/1999 | Carrithers et al. |
| 5,828,812 A | 10/1998 | Khan et al. | 5,958,007 A | 9/1999 | Lee et al. |
| 5,828,833 A | 10/1998 | Belville et al. | 5,960,411 A | 9/1999 | Hartman et al. |
| 5,832,211 A | 11/1998 | Blakley, III et al. | 5,961,593 A | 10/1999 | Gabber et al. |
| 5,832,460 A | 11/1998 | Bednar | 5,963,635 A | 10/1999 | Szlam et al. |
| 5,832,476 A | 11/1998 | Tada | 5,963,925 A | 10/1999 | Kolling et al. |
| 5,835,580 A | 11/1998 | Fraser | 5,963,952 A | 10/1999 | Smith |
| 5,835,603 A | 11/1998 | Coutts | 5,963,953 A | 10/1999 | Cram et al. |
| 5,838,903 A | 11/1998 | Blakely, III et al. | 5,966,695 A | 10/1999 | Melchione et al. |
| 5,838,906 A | 11/1998 | Doyle | 5,966,699 A | 10/1999 | Zandi |
| 5,842,178 A | 11/1998 | Giovannoli | 5,967,896 A | 10/1999 | Jorasch et al. |
| 5,842,211 A | 11/1998 | Horadan | 5,969,318 A | 10/1999 | Mackenthun |
| 5,844,553 A | 12/1998 | Hao | 5,970,143 A | 10/1999 | Schneier et al. |
| 5,845,259 A | 12/1998 | West et al. | 5,970,470 A | 10/1999 | Walker et al. |
| 5,845,260 A | 12/1998 | Nakano et al. | 5,970,478 A | 10/1999 | Walker et al. |
| 5,847,709 A | 12/1998 | Card | 5,970,482 A | 10/1999 | Pham |
| 5,848,400 A | 12/1998 | Chang | 5,970,483 A | 10/1999 | Evans |
| 5,848,427 A | 12/1998 | Hyodo | 5,978,467 A | 11/1999 | Walker et al. |
| 5,852,812 A | 12/1998 | Reeder | 5,983,196 A | 11/1999 | Wendkos |
| 5,857,079 A | 1/1999 | Claus et al. | 5,987,434 A | 11/1999 | Libman |
| 5,862,223 A | 1/1999 | Walker | 5,987,454 A | 11/1999 | Hobbs |
| 5,862,323 A | 1/1999 | Blakely, III et al. | 5,987,498 A | 11/1999 | Athing et al. |
| 5,864,830 A | 1/1999 | Armetta et al. | 5,991,736 A | 11/1999 | Ferguson et al. |
| RE36,116 E | 2/1999 | McCarthy | 5,991,738 A | 11/1999 | Ogram |
| 5,866,889 A | 2/1999 | Weiss et al. | 5,991,748 A | 11/1999 | Taskett |
| 5,870,718 A | 2/1999 | Spector | 5,991,751 A | 11/1999 | Rivette et al. |
| 5,870,725 A | 2/1999 | Belinger | 5,991,780 A | 11/1999 | Rivette |
| 5,871,398 A | 2/1999 | Schneier et al. | 5,995,948 A | 11/1999 | Whitford |
| 5,873,072 A | 2/1999 | Kight | 5,995,976 A | 11/1999 | Walker et al. |
| 5,873,096 A | 2/1999 | Lim | 5,999,596 A | 12/1999 | Walker et al. |
| 5,880,769 A | 3/1999 | Nemirofsky | 5,999,907 A | 12/1999 | Donner |
| 5,884,032 A | 3/1999 | Bateman | 6,000,033 A | 12/1999 | Kelly et al. |
| 5,884,270 A | 3/1999 | Walker et al. | 6,001,016 A | 12/1999 | Walker et al. |
| 5,884,272 A | 3/1999 | Walker et al. | 6,003,762 A | 12/1999 | Hayashida |
| 5,884,274 A | 3/1999 | Walker et al. | 6,005,939 A | 12/1999 | Fortenberry et al. |
| 5,884,288 A | 3/1999 | Chang | 6,006,205 A | 12/1999 | Loeb et al. |
| 5,889,863 A | 3/1999 | Weber | 6,006,249 A | 12/1999 | Leong |
| 5,892,900 A | 4/1999 | Ginter et al. | 6,009,415 A | 12/1999 | Shurling et al. |
| 5,898,780 A | 4/1999 | Liu et al. | 6,009,442 A | 12/1999 | Chen et al. |
| 5,899,982 A | 5/1999 | Randle | 6,010,404 A | 1/2000 | Walker et al. |
| 5,903,881 A | 5/1999 | Schrader | 6,012,088 A | 1/2000 | Li et al. |
| 5,909,486 A | 6/1999 | Walker et al. | 6,012,983 A | 1/2000 | Walker et al. |
| 5,910,988 A | 6/1999 | Ballard | 6,014,439 A | 1/2000 | Walker et al. |
| 5,913,202 A | 6/1999 | Motoyama | 6,014,635 A | 1/2000 | Harris et al. |
| 5,914,472 A | 6/1999 | Foladare et al. | 6,014,636 A | 1/2000 | Reeder |
| 5,915,244 A | 6/1999 | Jack et al. | 6,014,638 A | 1/2000 | Burge et al. |
| 5,918,214 A | 6/1999 | Perkowski | 6,014,641 A | 1/2000 | Loeb et al. |
| 5,918,217 A | 6/1999 | Maggioncalda | 6,014,645 A | 1/2000 | Cunningham |
| 5,918,239 A | 6/1999 | Allen et al. | 6,016,476 A | 1/2000 | Maes et al. |
| 5,920,847 A | 7/1999 | Kolling et al. | 6,016,810 A | 1/2000 | Ravenscroft |
| 5,921,864 A | 7/1999 | Walker et al. | 6,018,714 A | 1/2000 | Risen, Jr. |
| 5,923,763 A | 7/1999 | Walker et al. | 6,018,718 A | 1/2000 | Walker et al. |
| 5,926,796 A | 7/1999 | Walker et al. | 6,024,640 A | 2/2000 | Walker et al. |
| 5,926,812 A | 7/1999 | Hilsenrath | 6,026,398 A | 2/2000 | Brown et al. |
| 5,930,764 A | 7/1999 | Melchione | 6,026,429 A | 2/2000 | Jones et al. |
| 5,933,816 A | 8/1999 | Zeanah | 6,032,134 A | 2/2000 | Weissman |
| 5,933,817 A | 8/1999 | Hucal | 6,032,147 A | 2/2000 | Williams et al. |
| 5,933,823 A | 8/1999 | Cullen | 6,038,547 A | 3/2000 | Casto |
| 5,933,827 A | 8/1999 | Cole | 6,038,552 A | 3/2000 | Fleischl et al. |
| 5,940,812 A | 8/1999 | Tengel et al. | 6,042,006 A | 3/2000 | Van Tilburg et al. |
| 5,943,656 A | 8/1999 | Crooks | 6,044,362 A | 3/2000 | Neely |
| 5,944,824 A | 8/1999 | He | 6,045,039 A | 4/2000 | Stinson et al. |
| 5,945,653 A | 8/1999 | Walker et al. | 6,049,778 A | 4/2000 | Walker et al. |
| 5,946,388 A | 8/1999 | Walker et al. | 6,049,782 A | 4/2000 | Gottesman et al. |
| 5,947,747 A | 9/1999 | Walker et al. | 6,049,835 A | 4/2000 | Gagnon |
| 5,949,044 A | 9/1999 | Walker et al. | 6,055,637 A | 4/2000 | Hudson et al. |
| 5,949,875 A | 9/1999 | Walker et al. | 6,061,665 A | 5/2000 | Bahreman |
| 5,950,173 A | 9/1999 | Perkowski | 6,064,987 A | 5/2000 | Walker et al. |
| 5,950,174 A | 9/1999 | Brendzel | 6,065,120 A | 5/2000 | Laursen et al. |
| 5,950,206 A | 9/1999 | Krause | 6,065,675 A | 5/2000 | Teicher |
| 5,952,639 A | 9/1999 | Ohki | 6,070,147 A | 5/2000 | Harms et al. |
| 5,952,641 A | 9/1999 | Korshun | 6,070,153 A | 5/2000 | Simpson |
| 5,953,710 A | 9/1999 | Fleming | 6,070,244 A | 5/2000 | Orchier et al. |

| | | | | | | |
|---|---|---|---|---|---|---|
| 6,073,105 A | 6/2000 | Sutcliffe et al. | | 6,243,688 B1 | 6/2001 | Kalina |
| 6,073,113 A | 6/2000 | Guinan | | 6,243,816 B1 | 6/2001 | Fang et al. |
| 6,075,519 A | 6/2000 | Okatani et al. | | 6,253,327 B1 | 6/2001 | Zhang et al. |
| 6,076,072 A | 6/2000 | Libman | | 6,253,328 B1 | 6/2001 | Smith, Jr. |
| 6,081,790 A | 6/2000 | Rosen | | 6,256,664 B1 | 7/2001 | Donoho et al. |
| 6,081,810 A | 6/2000 | Rosenzweig et al. | | 6,260,026 B1 | 7/2001 | Tomida et al. |
| 6,081,900 A | 6/2000 | Subramaniam et al. | | 6,266,648 B1 | 7/2001 | Baker, III |
| 6,085,168 A | 7/2000 | Mori et al. | | 6,266,683 B1 | 7/2001 | Yehuda et al. |
| 6,088,444 A | 7/2000 | Walker et al. | | 6,267,292 B1 | 7/2001 | Walker et al. |
| 6,088,451 A | 7/2000 | He et al. | | 6,269,348 B1 | 7/2001 | Pare et al. |
| 6,088,683 A | 7/2000 | Jalili | | 6,275,944 B1 | 8/2001 | Kao et al. |
| 6,088,686 A | 7/2000 | Walker et al. | | 6,289,322 B1 | 9/2001 | Kitchen et al. |
| 6,088,700 A | 7/2000 | Larsen et al. | | 6,298,330 B1 | 10/2001 | Gardenswartz et al. |
| 6,091,817 A | 7/2000 | Bertina et al. | | 6,298,356 B1 | 10/2001 | Jawahar et al. |
| 6,092,192 A | 7/2000 | Kanevsky et al. | | 6,301,567 B1 | 10/2001 | Leong et al. |
| 6,092,196 A | 7/2000 | Reiche | | 6,308,273 B1 | 10/2001 | Goertzel et al. |
| 6,095,412 A | 8/2000 | Bertina et al. | | 6,308,274 B1 | 10/2001 | Swift |
| 6,098,070 A | 8/2000 | Maxwell | | 6,311,275 B1 | 10/2001 | Jin et al. |
| 6,101,486 A | 8/2000 | Roberts et al. | | 6,317,834 B1 | 11/2001 | Gennaro et al. |
| 6,104,716 A | 8/2000 | Crichton et al. | | 6,317,838 B1 | 11/2001 | Baize |
| 6,105,012 A | 8/2000 | Chang et al. | | 6,324,524 B1 | 11/2001 | Lent et al. |
| 6,105,865 A | 8/2000 | Hardesty | | 6,327,573 B1 | 12/2001 | Walker et al. |
| 6,111,858 A | 8/2000 | Greaves et al. | | 6,327,578 B1 | 12/2001 | Linehan |
| 6,112,181 A | 8/2000 | Shear et al. | | 6,332,192 B1 | 12/2001 | Boroditisky et al. |
| 6,115,690 A | 9/2000 | Wong | | 6,336,104 B1 | 1/2002 | Walker et al. |
| 6,119,093 A | 9/2000 | Walker et al. | | 6,343,279 B1 | 1/2002 | Bissonette et al. |
| 6,119,099 A | 9/2000 | Walker et al. | | 6,345,261 B1 | 2/2002 | Feidelson |
| 6,128,599 A | 10/2000 | Walker et al. | | 6,349,242 B2 | 2/2002 | Mahaffey |
| 6,128,602 A | 10/2000 | Northington et al. | | 6,349,336 B1 | 2/2002 | Sit et al. |
| 6,131,810 A | 10/2000 | Weiss et al. | | 6,363,381 B1 | 3/2002 | Lee et al. |
| 6,134,549 A | 10/2000 | Regnier et al. | | 6,385,591 B1 | 5/2002 | Mankoff |
| 6,134,592 A | 10/2000 | Montulli | | 6,385,652 B1 | 5/2002 | Brown et al. |
| 6,135,349 A | 10/2000 | Zirkel | | 6,401,125 B1 | 6/2002 | Makarios et al. |
| 6,138,106 A | 10/2000 | Walker et al. | | 6,401,211 B1 | 6/2002 | Brezak, Jr. et al. |
| 6,138,118 A | 10/2000 | Koppstein et al. | | 6,408,389 B2 | 6/2002 | Grawrock et al. |
| 6,141,651 A | 10/2000 | Riley et al. | | 6,411,933 B1 | 6/2002 | Maes et al. |
| 6,141,666 A | 10/2000 | Tobin | | 6,418,457 B1 | 7/2002 | Schmidt et al. |
| 6,144,946 A | 11/2000 | Iwamura | | 6,438,594 B1 | 8/2002 | Bowman-Amuah |
| 6,144,948 A | 11/2000 | Walker et al. | | 6,438,666 B2 | 8/2002 | Cassagnol et al. |
| 6,145,086 A | 11/2000 | Bellemore et al. | | 6,449,765 B1 | 9/2002 | Ballard |
| 6,148,293 A | 11/2000 | King | | 6,453,353 B1 | 9/2002 | Win et al. |
| 6,151,584 A | 11/2000 | Papierniak et al. | | 6,460,141 B1 | 10/2002 | Olden |
| 6,154,750 A | 11/2000 | Roberge et al. | | 6,487,641 B1 | 11/2002 | Cusson et al. |
| 6,154,879 A | 11/2000 | Pare et al. | | 6,493,677 B1 | 12/2002 | von Rosen et al. |
| 6,161,182 A | 12/2000 | Nadooshan | | 6,493,685 B1 | 12/2002 | Ensel et al. |
| 6,164,533 A | 12/2000 | Barton | | 6,496,855 B1 | 12/2002 | Hunt et al. |
| 6,170,011 B1 | 1/2001 | Beck et al. | | 6,496,936 B1 | 12/2002 | French et al. |
| 6,178,511 B1 | 1/2001 | Cohen et al. | | 6,507,912 B1 | 1/2003 | Matyas, Jr. et al. |
| 6,182,052 B1 | 1/2001 | Fulton et al. | | 6,510,523 B1 | 1/2003 | Perlman et al. |
| 6,182,142 B1 | 1/2001 | Win et al. | | 6,526,404 B1 | 2/2003 | Slater et al. |
| 6,182,220 B1 | 1/2001 | Chen et al. | | 6,532,284 B2 | 3/2003 | Walker et al. |
| 6,182,225 B1 | 1/2001 | Hagiuda et al. | | 6,535,855 B1 | 3/2003 | Cahill et al. |
| 6,185,242 B1 | 2/2001 | Arthur et al. | | 6,535,917 B1 | 3/2003 | Zamanzadeh et al. |
| 6,189,029 B1 | 2/2001 | Fuerst | | 6,535,980 B1 | 3/2003 | Kumar et al. |
| 6,192,361 B1 * | 2/2001 | Huang ............... 707/9 | | 6,539,424 B1 | 3/2003 | Dutta |
| 6,195,644 B1 | 2/2001 | Bowie | | 6,557,039 B1 | 4/2003 | Leong et al. |
| 6,199,077 B1 | 3/2001 | Inala et al. | | 6,574,348 B1 | 6/2003 | Venkatesan et al. |
| 6,201,948 B1 | 3/2001 | Cook et al. | | 6,580,814 B1 | 6/2003 | Ittycheriah et al. |
| 6,202,005 B1 | 3/2001 | Mahaffey | | 6,581,040 B1 | 6/2003 | Wright et al. |
| 6,202,054 B1 | 3/2001 | Lawlor et al. | | 6,584,505 B1 | 6/2003 | Howard et al. |
| 6,202,151 B1 | 3/2001 | Musgrave et al. | | 6,584,508 B1 | 6/2003 | Epstein et al. |
| 6,202,158 B1 | 3/2001 | Urano et al. | | 6,589,291 B1 | 7/2003 | Boag et al. |
| 6,208,978 B1 | 3/2001 | Walker et al. | | 6,592,044 B1 | 7/2003 | Wong et al. |
| 6,208,984 B1 | 3/2001 | Rosenthal | | 6,609,106 B1 | 8/2003 | Robertson |
| 6,216,115 B1 | 4/2001 | Barrameda et al. | | 6,609,113 B1 | 8/2003 | O'Leary et al. |
| 6,219,639 B1 | 4/2001 | Bakis et al. | | 6,609,125 B1 | 8/2003 | Layne et al. |
| 6,219,706 B1 | 4/2001 | Fan | | 6,609,198 B1 | 8/2003 | Wood et al. |
| 6,222,914 B1 | 4/2001 | McMullin | | 6,609,654 B1 | 8/2003 | Anderson et al. |
| 6,226,623 B1 | 5/2001 | Schein et al. | | 6,618,579 B1 | 9/2003 | Smith et al. |
| 6,226,679 B1 | 5/2001 | Gupta | | 6,618,806 B1 | 9/2003 | Brown et al. |
| 6,226,752 B1 | 5/2001 | Gupta et al. | | 6,623,415 B2 | 9/2003 | Gates et al. |
| 6,227,447 B1 | 5/2001 | Campisano | | 6,640,302 B1 | 10/2003 | Subramaniam et al. |
| 6,230,148 B1 | 5/2001 | Pare et al. | | 6,647,400 B1 * | 11/2003 | Moran ............... 707/205 |

| | | | | | | |
|---|---|---|---|---|---|---|
| 6,668,322 B1 | 12/2003 | Wood et al. | | 2002/0104017 A1 | 8/2002 | Stefan |
| 6,675,261 B2 | 1/2004 | Shandony | | 2002/0107788 A1 | 8/2002 | Cunningham |
| 6,684,384 B1 | 1/2004 | Bickerton et al. | | 2002/0144135 A1* | 10/2002 | Langford et al. ........... 713/200 |
| 6,687,222 B1 | 2/2004 | Albert et al. | | 2002/0152163 A1 | 10/2002 | Bezos et al. |
| 6,687,245 B2 | 2/2004 | Fangman et al. | | 2002/0165949 A1 | 11/2002 | Na |
| 6,697,947 B1 | 2/2004 | Matyas, Jr. et al. | | 2002/0174010 A1 | 11/2002 | Rice, III |
| 6,714,987 B1 | 3/2004 | Amin et al. | | 2002/0184507 A1 | 12/2002 | Makower et al. |
| 6,718,482 B2 | 4/2004 | Sato et al. | | 2002/0188869 A1 | 12/2002 | Patrick |
| 6,718,535 B1 | 4/2004 | Underwood | | 2002/0191548 A1 | 12/2002 | Ylonen et al. |
| 6,725,269 B1 | 4/2004 | Megiddo | | 2002/0198806 A1 | 12/2002 | Blagg et al. |
| 6,735,695 B1 | 5/2004 | Gopalakrishnan et al. | | 2003/0001888 A1 | 1/2003 | Power |
| 6,738,779 B1 | 5/2004 | Shapira | | 2003/0018915 A1 | 1/2003 | Stoll |
| 6,751,654 B2 | 6/2004 | Massarani et al. | | 2003/0023880 A1 | 1/2003 | Edward et al. |
| 6,754,833 B1 | 6/2004 | Black et al. | | 2003/0034388 A1 | 2/2003 | Routhenstein et al. |
| 6,755,341 B1 | 6/2004 | Wong et al. | | 2003/0037131 A1 | 2/2003 | Verma |
| 6,766,370 B2 | 7/2004 | Glommen et al. | | 2003/0037142 A1 | 2/2003 | Munger et al. |
| 6,769,605 B1 | 8/2004 | Magness | | 2003/0040995 A1 | 2/2003 | Daddario et al. |
| 6,772,146 B2 | 8/2004 | Khemlani et al. | | 2003/0046587 A1 | 3/2003 | Bheemarasetti et al. |
| 6,785,810 B1 | 8/2004 | Lirov et al. | | 2003/0046589 A1 | 3/2003 | Gregg |
| 6,789,115 B1 | 9/2004 | Singer et al. | | 2003/0051026 A1 | 3/2003 | Carter et al. |
| 6,805,288 B2 | 10/2004 | Routhenstein et al. | | 2003/0055871 A1 | 3/2003 | Roses |
| 6,810,395 B1 | 10/2004 | Bharat | | 2003/0070069 A1 | 4/2003 | Belapurkar et al. |
| 6,819,219 B1 | 11/2004 | Bolle et al. | | 2003/0070084 A1 | 4/2003 | Satomaa et al. |
| 6,820,202 B1 | 11/2004 | Wheeler et al. | | 2003/0074580 A1 | 4/2003 | Knouse et al. |
| 6,826,696 B1 | 11/2004 | Chawla et al. | | 2003/0079147 A1 | 4/2003 | Hsieh et al. |
| 6,832,202 B1 | 12/2004 | Schuyler et al. | | 2003/0084345 A1 | 5/2003 | Bjornestad et al. |
| 6,847,991 B1 | 1/2005 | Kurapati | | 2003/0084647 A1 | 5/2003 | Smith et al. |
| 6,856,970 B1 | 2/2005 | Campbell et al. | | 2003/0088552 A1 | 5/2003 | Bennett et al. |
| 6,892,231 B2 | 5/2005 | Jager | | 2003/0105981 A1 | 6/2003 | Miller et al. |
| 6,907,566 B1 | 6/2005 | McElfresh et al. | | 2003/0110399 A1 | 6/2003 | Rail |
| 6,925,481 B2 | 8/2005 | Singhal et al. | | 2003/0115160 A1 | 6/2003 | Nowlin et al. |
| 6,934,848 B1 | 8/2005 | King et al. | | 2003/0119642 A1 | 6/2003 | Gates et al. |
| 6,938,158 B2 | 8/2005 | Azuma | | 2003/0154403 A1 | 8/2003 | Keinsley et al. |
| 6,950,936 B2 | 9/2005 | Subramaniam et al. | | 2003/0159072 A1 | 8/2003 | Bellinger et al. |
| 6,957,337 B1 | 10/2005 | Chainer et al. | | 2003/0163700 A1 | 8/2003 | Paatero |
| 6,965,939 B2 | 11/2005 | Cuomo et al. | | 2003/0163733 A1 | 8/2003 | Barriga-Caceres et al. |
| 6,976,164 B1 | 12/2005 | King et al. | | 2003/0177067 A1 | 9/2003 | Cowell et al. |
| 6,980,962 B1 | 12/2005 | Arganbright et al. | | 2003/0182586 A1* | 9/2003 | Numano ..................... 713/202 |
| 6,983,421 B1 | 1/2006 | Lahti et al. | | 2003/0191549 A1 | 10/2003 | Otsuka et al. |
| 6,992,786 B1 | 1/2006 | Breding et al. | | 2004/0031856 A1 | 2/2004 | Atsmon et al. |
| 7,010,512 B1 | 3/2006 | Gillin et al. | | 2004/0039692 A1* | 2/2004 | Shields et al. ................ 705/39 |
| 7,020,696 B1 | 3/2006 | Perry et al. | | 2004/0049702 A1 | 3/2004 | Subramaniam et al. |
| 7,032,110 B1 | 4/2006 | Su et al. | | 2004/0068559 A1* | 4/2004 | Shaw ........................ 709/224 |
| 7,058,817 B1 | 6/2006 | Ellmore | | 2004/0117409 A1 | 6/2004 | Scahill et al. |
| 7,080,036 B1 | 7/2006 | Drummond et al. | | 2004/0128169 A1* | 7/2004 | Lusen ........................... 705/3 |
| 7,089,208 B1 | 8/2006 | Levchin et al. | | 2004/0148259 A1* | 7/2004 | Reiners et al. ................ 705/42 |
| 7,089,503 B1 | 8/2006 | Bloomquist et al. | | 2005/0080747 A1 | 4/2005 | Anderson et al. |
| 7,093,020 B1 | 8/2006 | McCarty et al. | | 2005/0082362 A1 | 4/2005 | Anderson et al. |
| 7,117,239 B1 | 10/2006 | Hansen | | 2005/0086160 A1 | 4/2005 | Wong et al. |
| 7,137,006 B1 | 11/2006 | Grandcolas et al. | | 2005/0086177 A1 | 4/2005 | Anderson et al. |
| 2001/0011255 A1 | 8/2001 | Asay et al. | | 2005/0120180 A1 | 6/2005 | Schornbach et al. |
| 2001/0012974 A1 | 8/2001 | Mahaffey | | 2005/0278641 A1 | 12/2005 | Mansour et al. |
| 2001/0027474 A1 | 10/2001 | Nachman et al. | | | | |
| 2001/0032184 A1 | 10/2001 | Tenembaum | | FOREIGN PATENT DOCUMENTS | | |
| 2001/0047295 A1 | 11/2001 | Tenembaum | | | | |
| 2001/0051917 A1 | 12/2001 | Bissonette et al. | | DE | 19731293 | 1/1999 |
| 2001/0054003 A1 | 12/2001 | Chien et al. | | EP | 0855659 | 7/1998 |
| 2002/0007313 A1 | 1/2002 | Mai et al. | | EP | 0884877 | 12/1998 |
| 2002/0007460 A1 | 1/2002 | Azuma | | EP | 0917119 | 5/1999 |
| 2002/0010599 A1 | 1/2002 | Levison | | EP | 1014318 A2 | 6/2000 |
| 2002/0010668 A1 | 1/2002 | Travis et al. | | EP | 1022664 | 7/2000 |
| 2002/0018585 A1 | 2/2002 | Kim | | EP | 1056043 | 11/2000 |
| 2002/0019938 A1 | 2/2002 | Aarons | | EP | 1089516 | 4/2001 |
| 2002/0023108 A1 | 2/2002 | Daswani et al. | | EP | 01088659 | 11/2001 |
| 2002/0029269 A1 | 3/2002 | McCarty et al. | | JP | H10-187467 | 7/1998 |
| 2002/0032613 A1 | 3/2002 | Buettgenbach et al. | | JP | 200324329 | 11/2000 |
| 2002/0032650 A1 | 3/2002 | Hauser et al. | | JP | 2001134672 | 5/2001 |
| 2002/0059141 A1 | 5/2002 | Davies et al. | | JP | 2005-242976 | 9/2005 |
| 2002/0077978 A1 | 6/2002 | O'Leary et al. | | WO | 97/43736 | 11/1997 |
| 2002/0087447 A1 | 7/2002 | McDonald et al. | | WO | 99/40507 A1 | 8/1999 |
| 2002/0095443 A1 | 7/2002 | Kovack | | WO | 99/52051 | 10/1999 |
| 2002/0099826 A1 | 7/2002 | Summers et al. | | WO | 00/68858 | 11/2000 |
| 2002/0104006 A1 | 8/2002 | Boate et al. | | WO | 01/18656 A1 | 3/2001 |

| | | |
|---|---|---|
| WO | 01/35355 | 5/2001 |
| WO | 01/43084 | 6/2001 |
| WO | 02/17082 A1 | 2/2002 |
| WO | 2004/079603 | 9/2004 |

OTHER PUBLICATIONS

Summary of the At Your Request Architecture, First USA Bank Confidential and Proprietary, Apr. 2, 1999, pp. 1-8.
Siebel; Siebel: Ensuring Customer Success, www.siebel.com, Nov. 17, 1999.
OMG; Welcome to OMG's Corba for Beginners Page!, www.omg. co, May 25, 1999.
Sun Microsystems, Inc.; Schema for Representing Corba Objects in an LDAP Directory, May 21, 1999, pp. 1-9.
OMG; Library, www.omg.com, May 25, 1999.
OMG; What is Corba?, www.omg.com, May 25, 1999.
Anonymous; Overview of Corba, May 25, 1999.
Anonymous; Corba Overview, Arch2.HTM At Pent21.Infosys. Tuwien.AC.AT, May 25, 1999.
Java; Java (™) Technology in the Real World, Java.Sun.com, May 21, 1999.
Java; Java(™) Servlet Api, Java.Sun.com, May 21, 1999.
Java; Staying in Touch With JNDI, Java.Sun.com, May 21, 1999.
Java; Java(™) Remote Method Invocation (RMI) Interface, Java. Sun.com, May 32, 1999.
Java; Banking on Java(™) Technology, Java.Sun.com, May 21, 1999.
Applets, Java.Sun.com, May 21, 1999.
Java; The JDBC(™) Data Access Api, Java.Sun.com, May 21, 1999.
Thomas; Enterprise Javabeans(™) Technology: Server Component Model for the Java(™) Platform, Java.Sun.com, May 2, 1999.
Getting Smart With Java: Sun Micro Says American Express to Use Java for Smart Card, ABCnews.com, printed on Jun. 6, 2000.
Bank; Cash, Check,Charge—What's Next?, Seattle Times, Mar 6, 1995.
Vandenengel; Cards on the Internet: Advertising on a $3 Bill, Industry Intelligence, Feb. 1, 1995, pp. 46-48.
Strassel; Dutch Software Concern Experiments With Electronic 'Cash' in Cyberspace, The Wall Street Journal, Apr. 17, 1995.
Kutler; Cash Card Creator Looking Beyond Mondex, Feb. 9, 1995.
Post; E-Cash: Can't Live With it, Can't Live Without it, The American Lawyer, Mar. 1, 1995, pp. 116-117.
Mitchell; Cyberspace: Crafting Softwarea, Business Week, Feb. 27, 1999, pp. 78-86.
Kutler; A Different Drummer on the Data Highway, American Banker, Section: No. 91, vol. 160, May 12, 1995, p. 14.
Epper; A Player Goes After Big Bucks in Cyberspace, American Banker, vol. 160, No. 86, ISSN: 0002-7561, May 5, 1995, p. 17.
Barnham; Network Brings Together Producers and Companies, Document ID: 17347.
Houlder; OFT Gives the Individual Top Priority: Report Calls for Deregulation of Business Lending, Doucment ID: 91716, Jun. 8, 1994.
Maize; Fannie Mae on the Web, Doucment ID: 52079, May 8, 1995.
Knowles; Improved Internet Security Enabling On-Line Commerce, PCWeek, vol. 12, No. 11, ISSN: 0740-1604, Mar. 20, 1995.
Anonymous: Aversion Therapy: Banks Overcoming Fear of the Net to Develop Safe Internet-Based Payment System w/Netscape Communicator, Network World, ISSN: 0887-7661, Dec. 12, 1994.
Clark; Microsoft, Visa to Jointly Develop PC Electronic-Shopping Software, The Wall Street Journal, Nov. 9, 1994 WSJ B9.
Hewlett-Packard Company; Understanding Product Data Management, Hewlett-Packard Company.
Getting Started: Specific GE TPN Post Service Use Guidelines, Printed on Apr. 26, 1999.
Resource Center: Consolidated Edison Selects GE TPN Post, Printed Apr. 26, 1999.
Thomas Publishing Company; Thomasnet, Apr. 26, 1999.
Thomas Publishing Company; Solusource: For Engineers by Engineers, Thomas Publishing Company, Apr. 26, 1999.
Harris; Harris Infosource, Printed on Apr. 26, 1999.
Welcome to Muse, Apr. 26, 1999.

Product Data Integration Technologies, Inc., Step Integratin Authors, Printed on Apr. 26, 1999.
SBA: Pro-Net, U.S. Small Business Administration Procurement Marketing and Access Network, Last Modified: Apr. 1, 1999.
Freemarkets, Printed on Apr. 26, 1999.
At Your Request, www.wingspanbank.com, Sep. 28, 1999.
Meredith; Internet Bank Moves Closer to Virtual Reality, USA Today, May 5, 1995.
Sirbu, et al; Netbill: An Internet Commerce System Optimized for Network Delivered Services, Printed on Feb. 27, 1995.
The Check is in the Email, Information Today, vol. 12, No. 3, ISSN: 8755-6286, Mar. 1995.
The Gale Group; G&D America's Multi-Application Smart Card Selected for Combined Payroll and 'Virtual Banking' Program in Mexico, Business Wire, Apr. 24, 1998, P241047.
Mitchell; Netlink Goes After an Unbanked Niche, Card Technology, ISSN: 1093-1279, Sep. 1999, p. 22.
Berry et al.; A Potent New Tool for Selling Database, Business Week, Cover Story, Sep. 5, 1994, pp. 56-62.
Shibata; Seventh International Conference on Parallel and Distributed Systems: Workshops, IEEE Computer Society, Jul. 4-7, 2000.
Jakobsson et al.; Secure and Lightweight Advertising on the Web, Computer Networks, 31 (1999) 1101-1109.
Fujimura et al.; XML Voucher: Generic Voucher Language, Feb. 2003.
Jepsen; Soap Cleans Up Interoperability Problems on the Web, IT PTO, Jan./Feb. 2001.
Chester; Cross-Platform Integration With XML and Soap, IT PTO Sep. 10, 2001.
Friedman; Dictionary of Business Terms, Barron's Third Edition, Copyright 2000.
Consortium Created to Manage Common Electronic Purse Specifications, http://www.visa.com/av/news/prmisc051199.vhtml, Printed Feb. 23, 2001.
Smartaxis, How it Works, http://www.smartaxis.co.uk/seller/ howitworks.html, Printed on Feb. 23, 2001.
Bechtel Construction Operations Incorporated Standardizes on Primavera's Expedition Contract Management Software, Business Wire, Jul. 27, 1999.
Primavera and Purchasepro.com to Create E-Commerce Marketplace for Construction Industry, Primavera Ships P3, Version 3.0, www.purchasepro.com/, Sep. 21, 1999, pp. 1-3.
Primavera Systems, Inc.—How the World Manages Projects, Expedition Contract Control Software, www.primavera.com, Jun. 23, 2005.
Civitello Jr.; Construction Operations Manual of Policies and Procedures, Third Edition, 2000.
Harris; Planning Using Primavera Project Planner P3 Version 3.0, User Guide Copyright 1999 by Eastwood Harry Pty Ltd., 1999.
Ritz; Total Construction Project Management, McGraw-Hill, 1994.
Marchman; Construction Scheduling With Primavera Project Planner, May 25, 1999.
Associates National Bank (DE) Credit Card, The Associates, www. theassociates.com/consumer/credit_cards/main.html , Apr. 6, 1999, 6 Pages.
Temporary Global Passwords, IBM Corporation, IBM TDB V36, N3, Mar. 1993, Order 93A 60636, Mar. 1, 1993, pp. 451-454.
Method of Protecting Data on a Personal Computer, IBM Corporation, TDB Nov. 1985, Order 85A 62426, Nov. 1, 1995, p. 2530.
Safe Single-Sign-on Protocol With Minimal Password Exposure No Decryption and Technology Adaptivity, IBM Corporation, TDB Mar. 1995, Order 95A, Mar. 1, 1995, pp. 245-248.
Servlet/Applet/HTML Authentication Process With Single Sign-on, IBM Corporation, IBM Order: 00A6004, Jan. 1, 2000.
Johnston; Pondering Passport: Do You Trust Microsoft With Your Data?, www.pcworld.com/resource/printable/article/0. aid,63244,00.asp, Sep. 24, 2001.
Kormann; Risks of the Passport Single Signon Protocol, Computer Networks, Elsevier Science Press, vol. 33, Sep. 20, 2003, pp. 51-58.
Carden, Philip; The New Face of Single Sign-on, Network Computing, http://www.networkcomputing.com, Printed Dec. 29, 2000, 4 Pages.

Marlin; Chasing Document Management, Inform, vol. 13, No. 4, Apr. 1999, p. 76-85.

Construction Financing to Build Your Own Home, ISBN: 0962864307, Jul. 1990.

Radosevich; Is Work Flow Working?, cnn.com, Apr. 6, 1999 at <http://www.cnn.com/tech/computing/9904/06/workflow/ent.idg, p. 1 of 5, Retrieved From the Internet on Nov. 28, 2005.

Omware, Inc., Web Pages, Feb. 2000, Retrieved From http://web.archive.org/web20000226033405/www.omware.com/products.html, Retrieved From the Internet on Nov. 28, 2005.

Point for Windows Version 3.X Interface Marketing Guide.PDF.

Frank; John N. Frank, Beyond Direct Mail, Credit Card Management, vol. 9, Iss. 5, Aug. 1996, 4PGS.

Mary C. Lacity, et al.; Mary C. Lacity, et al., The Information Systems Outsourcing Bandwagon, Sloan Management Review, vol. 35, No. 1, Fall 1993, p. 73-86.

Fusaro, Roberta; Builders Moving to Web Tools Computerworld, Nov. 16,1998, vol. 32, No. 46, pp. 51, 53.

Owens, David; Facilities Planning & Relocation Rsmeans, 1993, ISBN: 0-87629-281-3.

Larsen, Amy; Internet Goes to Work for Builders, Interweek, Nov. 16, 1998, Issue 741.

Primavera Systems Delivers Expedition Express,Business Wire, Feb. 23, 1999.

Deckmyn, Dominique; San Francisco Manages $45M Project Via Web-Based Service, Computerworld, Aug. 9, 1999, vol. 33, No. 32, p. 14.

Seibert, Paul; Facilities Planning & Design for Financial Institutions Bankline Publications, 1996, ISBN: 1-55738-780-X.

Mosig, Richard; Software Review: The Construction Project Manager Cost Engineering, Jan. 1996, vol. 38, No. 1, pp. 7-8.

Hernandez, Tomas et al.; Software Solutions Building Design & Construction, Nov. 1999, vol. 40, No. 11, pp. 38-40.

Taylor; Telecommunications Demand Analysis in Transition, Proceedings of the 31st Hawaii International Conference on System Sciences, vol. 5, Jan. 6-9, 1998, pp. 409-415.

Cotts, David; The Facility Management Handbook Second Edition AMACM, 1998, ISBN: 0-8144-030-8.

* cited by examiner

```
You are Requesting access to a privileged account  } 502
Please Key in Reason for Access to glexport Reason>>: Add UTI to the IRFE Feed  ←———— 504
                                                        ———— 508
Logging in as glexport  ←———— 506
Password:
Sun Microsystems Inc.    SunOS 5.8       Generic February 2000

*** IT IS AN OFFENSE TO CONTINUE WITHOUT THE CORRECT AUTHORIZATION ***

Individuals using this computer system with or without proper authority
are subject to having all of their activities monitored and recorded and
should have no expectation of privacy unless local law, regulation or
contract provides otherwise.

Anyone using this system expressly consents to such monitoring and to
all appropriate disclosure of any evidence of criminal activity to law
enforcement officials, as well as appropriate disclosure of any evidence
of violation of the firm's rules, policies, procedures or standards of
conduct to management.

Individuals using this computer system have a legal obligation to treat
all information on the system as strictly confidential and not to
disclose or allow such information to be disclosed to any third party.
This obligation survives any termination of employment with Morgan.

Script started, file is /tmp/xttools_as_glexport.26647.20020726
Sourcing ~/.setenvrc ...
Sourcing ~/.aliases ...
nydoesd1:glexport 1>
```

*support.20021016.summary.csv*

| HOST | LOGIN | LOGOUT | WHO | REASON | COMMENTS |
|---|---|---|---|---|---|
| nydoesp1-cmc | Oct 16 11:30:53 2002 | Oct 16 14:11:56 2002 | kravuri_as_pxttools | mellon problem | |
| nydoesp1-cmc | Oct 16 11:36:22 2002 | Oct 16 11:36:37 2002 | preuter_as_pgltrade | check outcry password for Jeff | |
| nydoesp1-cmc | Oct 16 17:38:27 2002 | Oct 16 17:47:30 2002 | preuter_as_pgltrade | setup slexifSSGA for ssga migration | |
| HOST | LOGIN | LOGOUT | WHO | REASON | COMMENTS |
| nydoesp2-cmc | Oct 16 02:14:06 2002 | Oct 16 09:14:28 2002 | mstanton_as_pgltrade | 5063-MXS-9BN | |
| nydoesp2-cmc | Oct 16 17:47:25 2002 | Oct 16 18:47:25 2002 | kravuri_as_pglcbot | cr 11436-mxs-bna | |
| HOST | LOGIN | LOGOUT | WHO | REASON | COMMENTS |
| nydoesp3-cmc | Oct 16 07:26:52 2002 | Oct 16 07:28:18 2002 | abelle_as_pglcme | to fix p14 processes for sleAP & EUR CD Ticket 5073-ARB-FAN | |
| nydoesp3-cmc | Oct 16 16:29:31 2002 | Oct 16 16:30:48 2002 | abelle_as_pglcme | to fix p14 process for sleEUR CD Ticket 5102-ARB-RW5 | |
| nydoesp3-cmc | Oct 16 07:30:23 2002 | Oct 16 07:30:55 2002 | abelle_as_pgltrade | to fix NetProbe CD Ticket # 5074-ARB-FDS | |
| nydoesp3-cmc | Oct 16 12:36:24 2002 | Oct 16 12:42:39 2002 | lnarayan_as_pglexprt | 11454-LN-V8K | |
| nydoesp3-cmc | Oct 16 17:38:53 2002 | Oct 16 18:47:28 2002 | kravuri_as_pglcbot | 11458-cxl-dc4 | |
| nydoesp3-cmc | Oct 16 18:53:05 2002 | Oct 16 18:58:19 2002 | tlatner_as_pglcbot | CR #11458-CXL-DC4 | |
| HOST | LOGIN | LOGOUT | WHO | REASON | COMMENTS |
| HOST | LOGIN | LOGOUT | WHO | REASON | COMMENTS |
| nydoesp5-cmc | Oct 16 12:37:01 2002 | Oct 16 12:45:22 2002 | abelle_as_pglcme | to check recep file | |
| nydoesp5-cmc | Oct 16 06:35:14 2002 | Oct 16 13:48:33 2002 | rmaraldo_as_pglcme | check user | |
| nydoesp5-cmc | Oct 16 18:14:29 2002 | Oct 16 18:52:36 2002 | tlatner_as_pglcme | CR #11458-CXL-DC4 | |
| nydoesp5-cmc | Oct 16 17:26:35 2002 | Oct 16 18:48:27 2002 | kravuri_as_pglcme | 11458-cxl-dc4 | |

FIG. 10

*sureport.nydoespl-cmc.20021016.detail.txt*

```
nydoespl-cmc Privileged Login Info for 20021016
------------------------------------------------
kravuri_as_pxttools
LOGIN:   Oct 16 11:30:53 2002
LOGOUT:  Oct 16 14:11:56 2002
REASON:  mellon problem
```

---

```
preuter_as_pgltrade
LOGIN:   Oct 16 11:36:22 2002
LOGOUT:  Oct 16 11:36:37 2002
REASON:  check outcry password for Jeff nydoespl-cmc:pgltrade:/apps/gltrade>cdh
nydoespl-cmc:pgltrade:/apps/gltrade>cd sleoutcryNA/conf
nydoespl-cmc:pgltrade:/apps/gltrade/sleoutcryNA/conf>view users.ini
```

---

```
preuter_as_pgltrade
LOGIN:   Oct 16 17:38:27 2002
LOGOUT:  Oct 16 17:47:30 2002
REASON:  setup slexifSSGA for ssga migration nydoespl-cmc:pgltrade:/apps/gltrade>cdh
nydoespl-cmc:pgltrade:/apps/gltrade>cd slexifSSGA/conf
nydoespl-cmc:pgltrade:/apps/gltrade/slexifSSGA/conf>../bin/stopslexif
nydoespl-cmc:pgltrade:/apps/gltrade/slexifSSGA/conf>cp -p slexif.ini
slexif.ini^R
nydoespl-cmc:pgltrade:/apps/gltrade/slexifSSGA/conf>vi slexif.ini
nydoespl-cmc:pgltrade:/apps/gltrade/slexifSSGA/conf>!v
nydoespl-cmc:pgltrade:/apps/gltrade/slexifSSGA/conf>cd ../log
nydoespl-cmc:pgltrade:/apps/gltrade/slexifSSGA/log>ll
nydoespl-cmc:pgltrade:/apps/gltrade/slexifSSGA/log>tf p10_20021016.log
```

METHOD FOR CONTROLLED AND AUDITED ACCESS TO PRIVILEGED ACCOUNTS ON COMPUTER SYSTEMS

CROSS-REFERENCE TO RELATED PATENT APPLICATION

This patent application is related to and claims the benefit of Provisional U.S. Patent Application No. 60/487,995 filed Jul. 17, 2003, which application is hereby incorporated by reference in it entirety.

FIELD OF THE INVENTION

This invention relates to the field of limiting access to privileged accounts on computer systems, and, more specifically, to a method for providing controlled access to privileged accounts and sensitive data, wherein any access is reported to management and is fully auditable.

BACKGROUND OF THE INVENTION

Computer security has become a critical issue in today's world. On one hand, enterprises are providing an ever-increasing number of services via computer systems for increasingly sophisticated, real-time transactions. At the same time, hacker break-ins, computer terrorism and employee (or former employee) sabotage is increasing. Thus, there is a tension between the need to keep computer system accessible for changes, upgrades and emergency fixes in order to keep business moving while preventing unauthorized access.

For example, sophisticated transactions involving stocks, bonds, derivatives, futures, etc., and combinations thereof, are executed internationally. These transactions are carried out on one or more secure accounts on one or more computer systems. Such secure accounts include, but are not limited to, trading services, price-feed services and data-feed services. These secured accounts are referred to herein as "Privileged Accounts." It is clear that Privileged Accounts must be secure to prevent tampering, unauthorized acquisition of private data, etc. It is also clear that that Privileged Accounts must have some form of access to keep these accounts up-to-date and operative to prevent financial loss, incorrect or missing data, unconsummated time-sensitive transactions, etc.

Therefore, there is a need in the art for a secure system and method for accessing Privileged Accounts.

SUMMARY OF THE INVENTION

This problem is solved and a technical advance is achieved in the art by a system and method that provides access to Privileged Accounts to users with Privileged Account access permission. The user must enter a reason for access. A message is sent to a Privileged Accounts manager when a user logs into a Privileged Account, which includes the user id, the account, the system and the reason. If the login is successful, all keystrokes are then logged. At the conclusion of the user session, the log file is closed and another message is sent to the Privileged Accounts manager. The log file may be sent to the manager at this time or saved for a batch transfer periodically.

According to an exemplary method of this invention, when a user attempts to log into an account, the account is verified against a list of Privileged Accounts that may be accessed. If the account is in the list, then the user is verified against a Privileged Account group. If the user is in the group, then the user is prompted for a reason for accessing the selected Privileged Account. A message is then sent to an account manager regarding the Privileged Account access, which may, advantageously, includes the user name or ID, the time and date, the Privileged Account being accessed and the reason.

If the login is successful, all key strokes are then recorded in a key log. Advantageously, the key log is duplicated. Further, if tampering is detected in the key log, the session is ended and the duplicate key log is sent to the account manager.

At the conclusion of the user session, the key log is closed and a second message sent to the account manager. This second message may include the key log file. Periodically, the key log files are collected and sent to a location for analysis and storage.

In this manner, security may be maintained on Privileged Accounts while permitting access to users that have permission. Further, management is informed of access to Privileged Accounts when they occur and can review all key strokes made by users.

BRIEF DESCRIPTION OF THE DRAWINGS

A more complete understanding of this invention may be obtained from a consideration of this specification taken in conjunction with the drawings, in which:

FIG. 9 is a sample of a log file summary according to an aspect of this invention.

DETAILED DESCRIPTION

Figure 1:
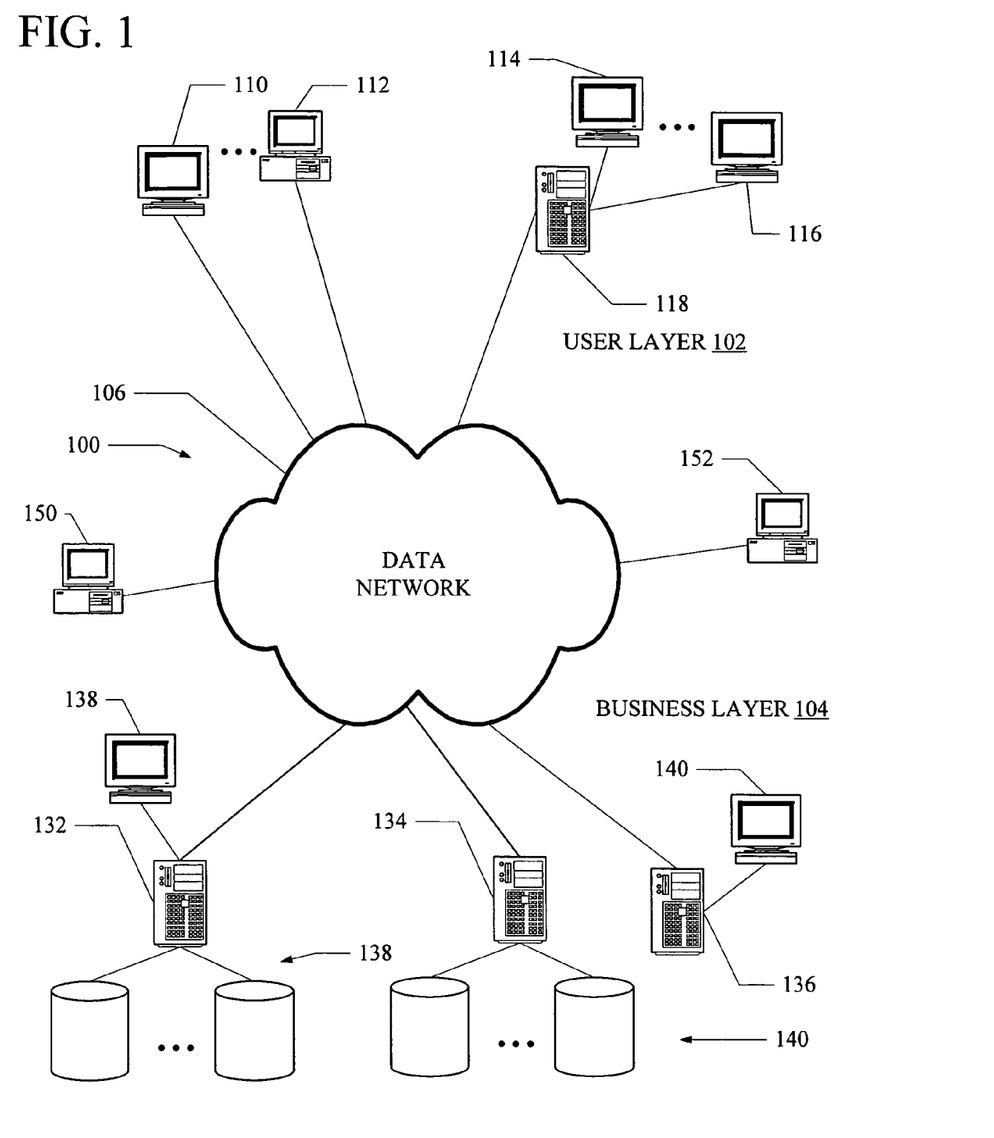
FIG. 1 is a block diagram of a data network in which an exemplary embodiment of this invention may be implemented.

FIG. 1 is a block diagram of an exemplary data network 100 used in effecting data flow and trading of instruments. While this invention is described in terms of a data network used for financial dealings, this invention may be used wherever security is required on a computer system. For example, a server for a web site may employ this invention. Also, a stand-alone system, such as a computer-controlled telephone exchange, may employ this invention. One skilled in the art will appreciate how to implement this invention in widely diverse applications after studying this specification.

Data network 100 comprises, in general, a plurality of users at user level 102 in communication with business layer 104 via data network 106. User level 102 comprises a plurality of user terminals, represented by workstation 110 and personal computer (PC) 112. Workstation 110, PC 112 or both can be used by traders or brokers in the investment community to, for example, obtain information and execute trades. Also illustrated in user layer 102 are workstations 114 and 116 connected to server 118. This server 118 and workstation 114, 116 community may be used, for example, by a brokerage house.

Business layer 104 comprises a plurality of servers, represented by servers 132, 134 and 138. By way of example, servers 132 and 134 comprise data servers connected to data storage components 138 and 140, respectively. Server 136 provides real-time data feeds from, for example, national data markets, international data markets or both. Terminal 138 and terminal 140 comprise command and maintenance terminals, as known in the art. These terminals permit authorized users to access servers 132 and 136, respectively, in order to perform regular maintenance and to fix real-time problems. Server 134, in this exemplary embodiment, provides for remote access from, for example, terminal 148 for maintenance. Data network 106 comprises, in this exemplary embodiment, the Internet. While data network 106 is described in terms of the Internet, any public or private data network may be used. PC 150 and PC 152 are illustrated herein as being connected to data network 106. PC 150 and PC 152 represent remote access terminals for remote administration of server 132, server 134 and server 136. Further, PC 150 and PC 152 represent regional or national management of business layer 104.

In the context of data network 100, business layer 104, and, more specifically, server 132, server 134 and server 136, are the primary users of an exemplary embodiment according to this invention. Server 132, server 134 and server 136 all contain data and transaction information that must remain confidential, proprietary or maintain a constant flow. Each service provided by these servers comprises an account on the server. In terms of this invention, each service provided by server 132, server 134 and server 136 comprises a Privileged Account, which is protected by an exemplary embodiment of this invention.

In the exemplary embodiment of this invention, UNIX is the operating system used in server 132, server 134 and server 136. While this invention is described in terms of the UNIX operating system (and its variants), one skilled in the art will appreciate how to apply the principals of this invention to other operating systems after studying this specification.

In accordance with the exemplary embodiment of this invention, a user at terminal 138 wants to apply a change request ("CR") in order to, for example, fix a known bug. The user logs in as usual and executes the "switchuser" (su) command to a selected Privileged Account in order to access to that Privileged Account. In the prior art, all the user would have to know is the password for "su," and the user can do anything to the account.

Figure 2:
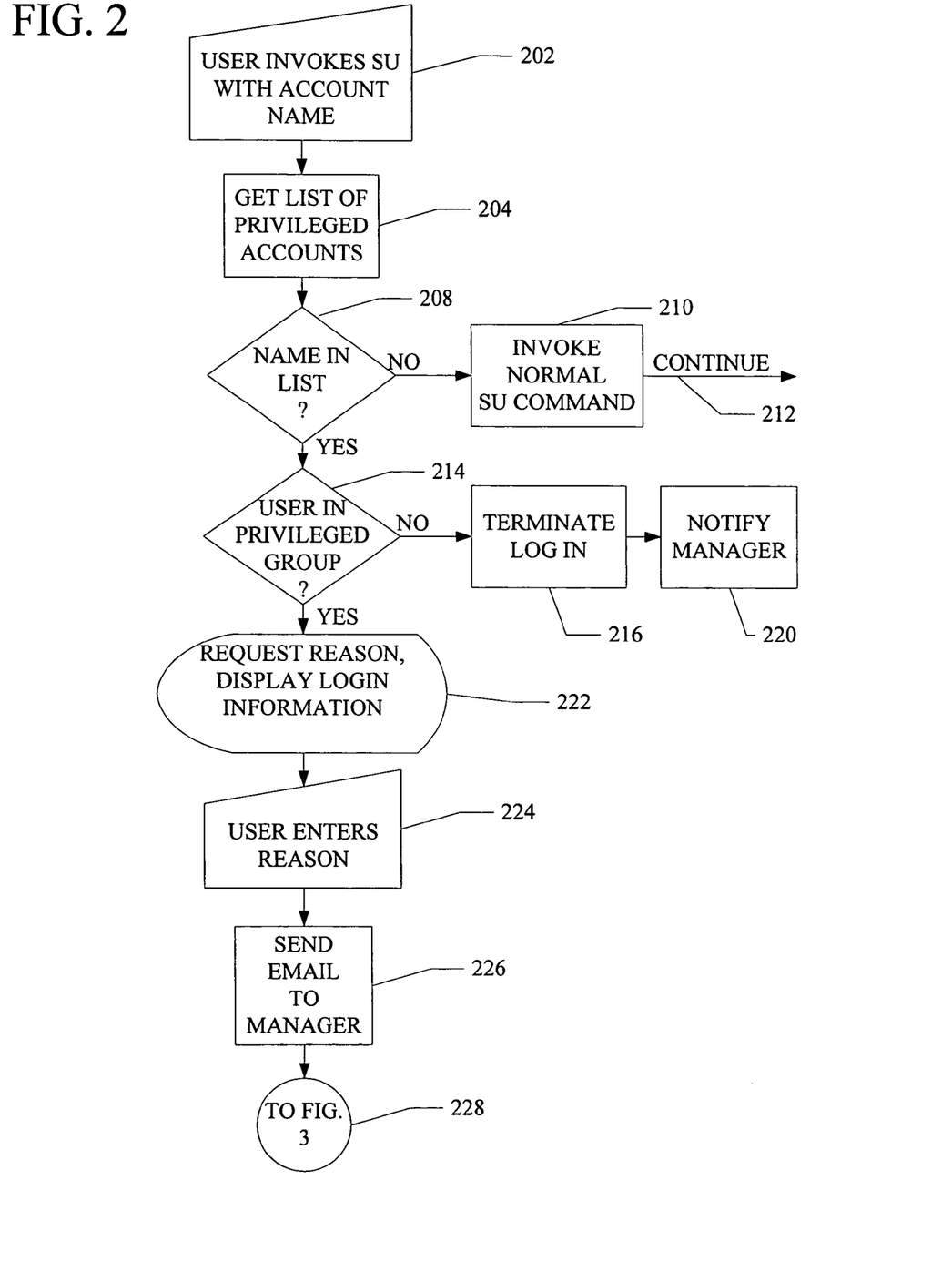
FIG. 2 is a flow chart of processing according to the exemplary embodiment of this invention.
Figure 3:
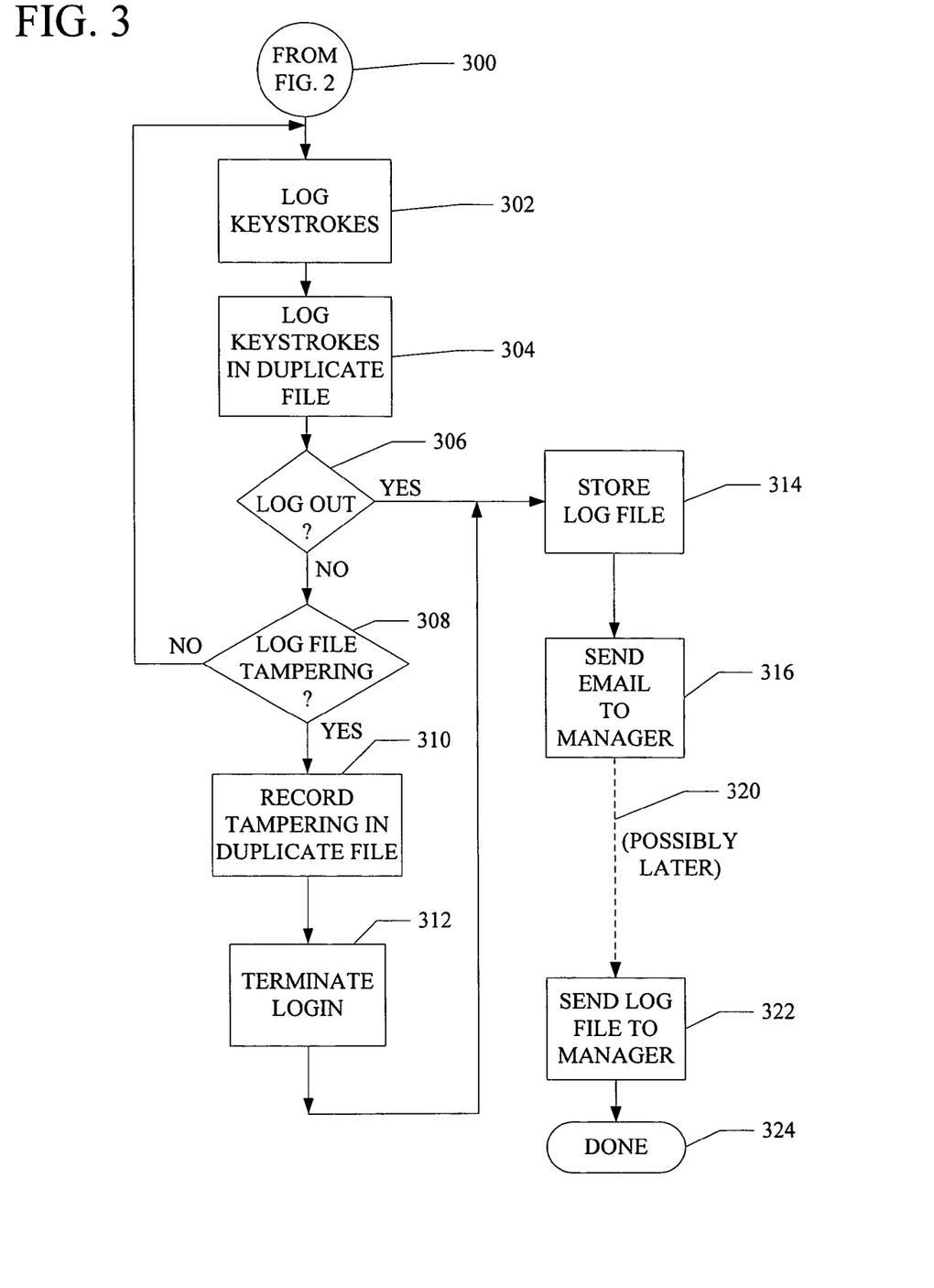
FIG. 3 is a flow chart of further processing according to the exemplary embodiment of this invention.

According to this invention, an "suwrapper" is placed around the usual UNIX su command. The usual UNIX su command is disabled to access certain accounts. Turning now to FIGS. 2 and 3, a flow chart of processing in accordance with this embodiment of this invention is shown. In input box 202, the user invokes the su command with an account name as an argument. The method according to this invention first retrieves a list of Privileged Accounts that can be accessed by this method in box 204. If, in decision diamond 206, the account is not in the list, then the user is permitted to su into it under the usual UNIX su command in box 210. Processing continues along arrow 212.

Figure 4:
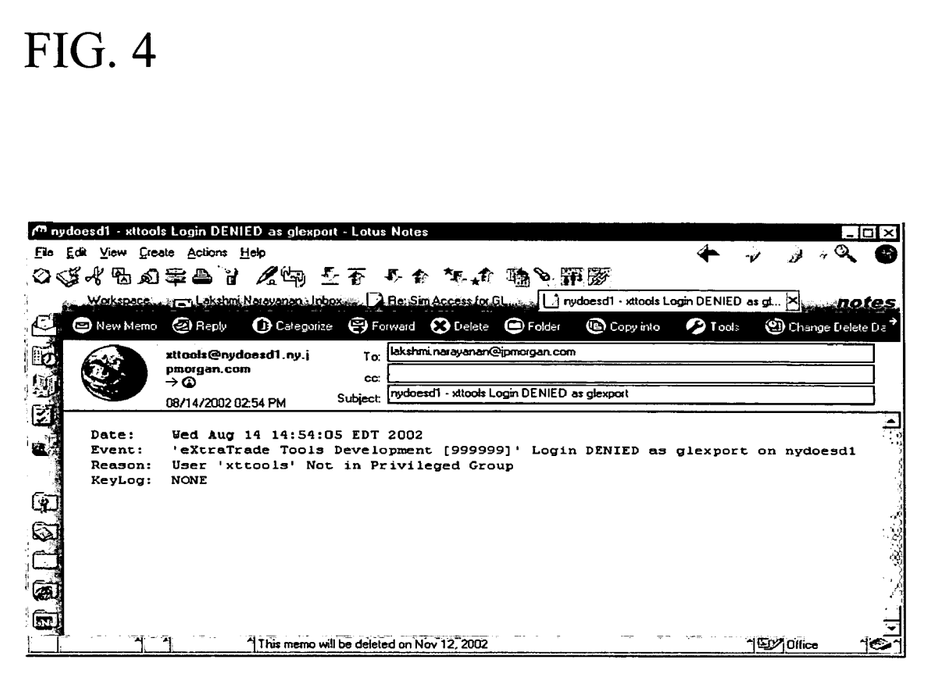
FIG. 4 is a screen shot of an email message when a login failed during the processing of FIG. 2.

If the selected account is in the Privileged Accounts list in decision diamond 214, then the user id is verified against a group list. If the user is not in the privileged group, the user is denied access in box 216 and a system manager is notified in box 218. FIG. 4 is a screen shot of such email to a manager. Information sent to the manager should be satisfactory to trace who tried to log into a Privileged Account, so that person may be dealt with in an appropriate manner.

Figure 5:
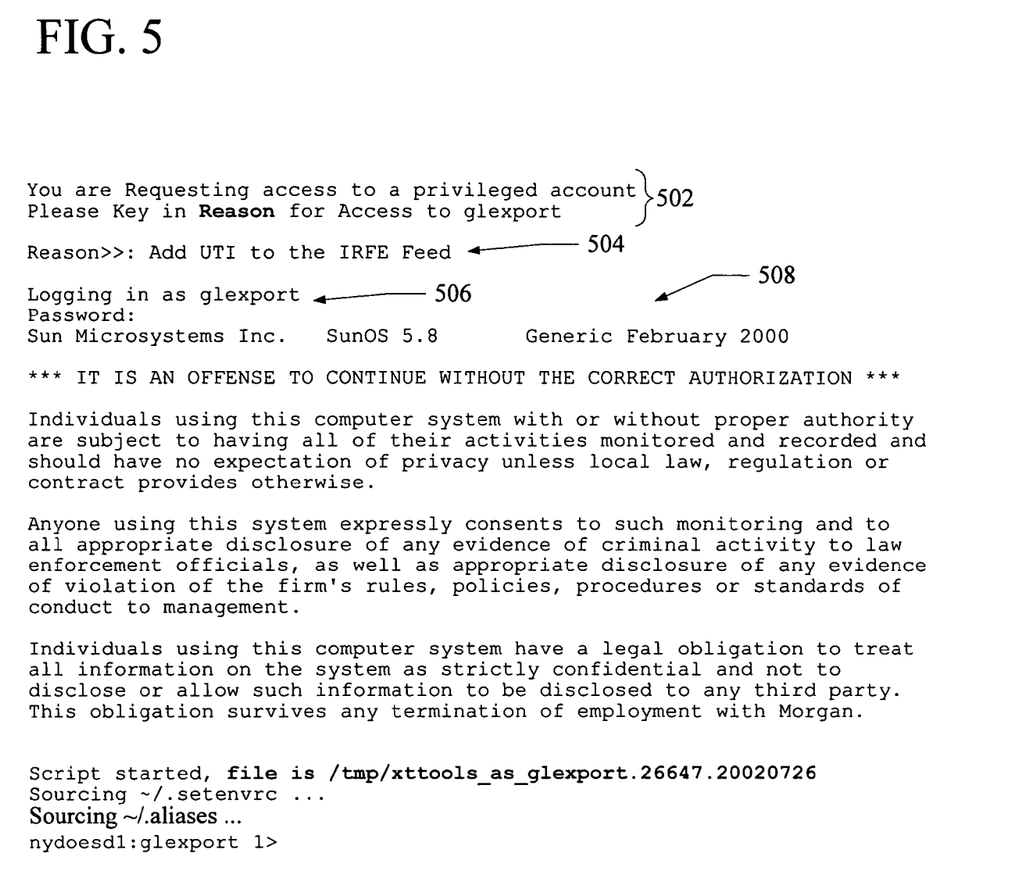
FIG. 5 is a screen shot of a successful login during the processing of FIG. 2.

If the user is in the privileged group as determined at decision diamond 214, then a screen as illustrated in FIG. 5 is displayed to the user. First, at 502 the user is prompted for a reason for the access. The user responds with a reason at 504. Logging in proceeds and the user is asked for the user's password at 506. Using the user's password at 506 prevents the user from knowing other accounts passwords. As is known in the art, the password is then verified and the system displays a warning screen, such as the warning screen at 508. The user is now logged in.

Figure 6:
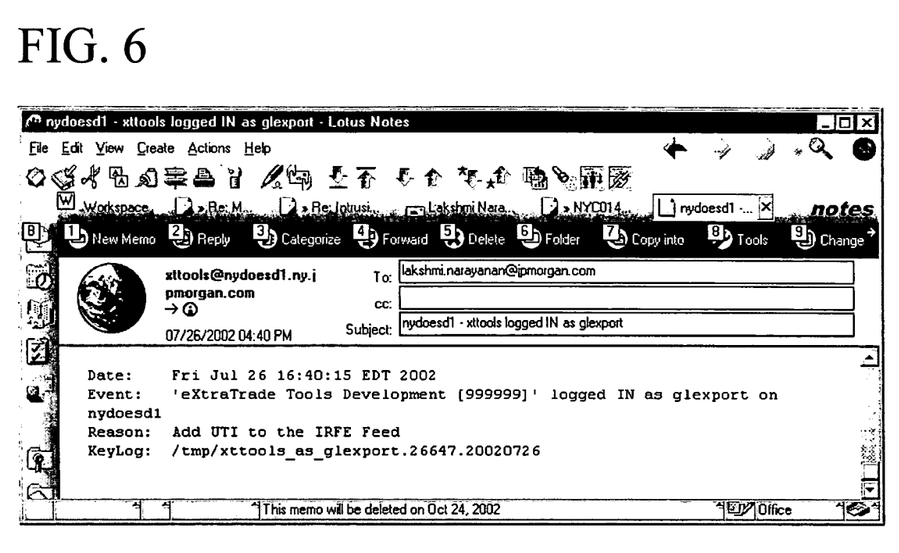
FIGS. 6 and 7 are screen shots of email messages that a manger may receive for successful logins during the processing of FIG. 2.
Figure 7:
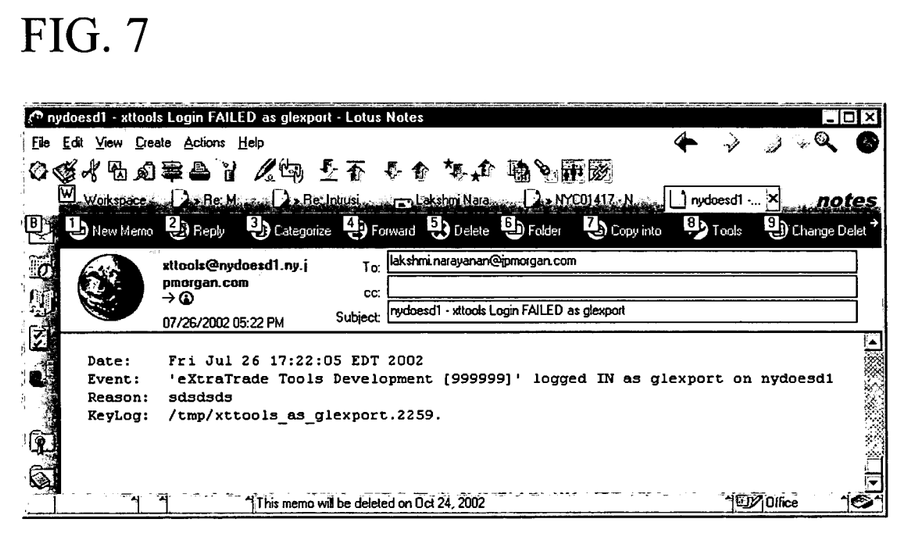

Returning to FIG. 2, an email message is sent to the manager in box 226. Sample email messages are shown in FIGS. 6 and 7. Both email messages include the date, the Privileged Account, the system and the reason. Additionally, the key log file is noted in the email so that the manager may access the file if necessary. Processing proceeds to FIG. 3 in connector 228.

Turning now to FIG. 3, processing continues from FIG. 2 at connector 300. At this point, the user is successfully logged in. The next four operations occur approximately simultaneously, as is known in the art, and are thus presented here in an order that facilitates flowcharting.

Processing continues in the context of the flowchart of FIG. 3 in box 302, where keystrokes are logged to a file. In box 304, keystrokes are logged to a duplicate file. In this manner, if the user attempts to tamper with the log file, the duplicate file is still available for managers to review and take action on.

In decision diamond 306, a determination is made whether the user logged out. If not, then processing moves to decision diamond 308, where a determination is made whether the user tampered with the log file. If the user did not tamper with the log file, then processing loops back to box 302.

If, in decision diamond 306, the user did tamper with the log file, then that fact is recorded in the duplicate log file in box 310. The login is terminated in box 312.

Figure 8:
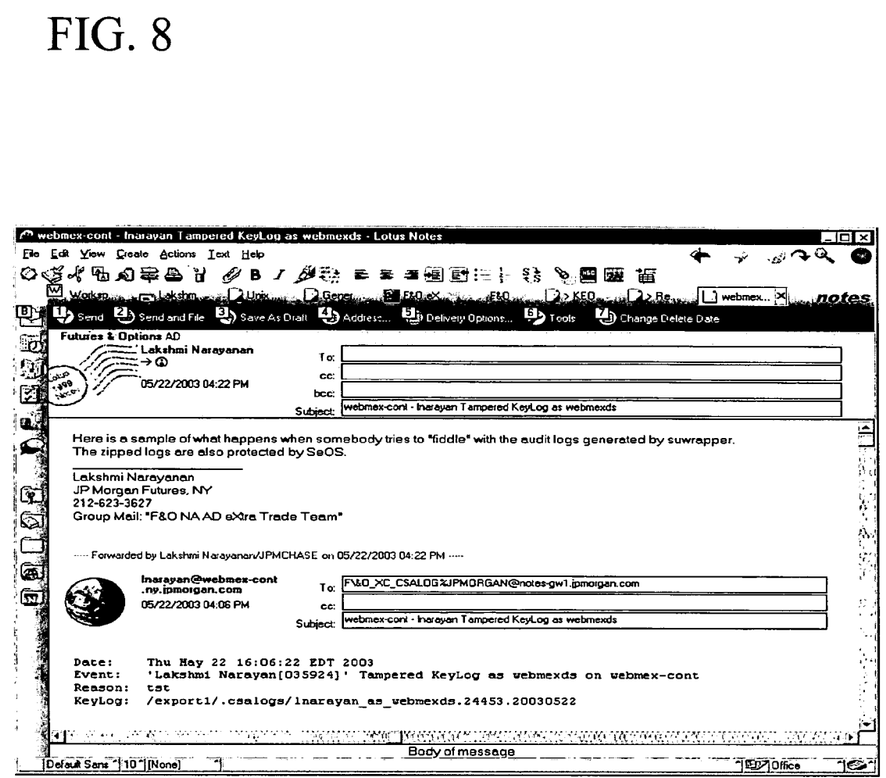
FIG. 8 is a screen shot of an email message that a manger receives when the user tampers with the log file during the processing of FIG. 3.

Processing from both the "YES" branch of decision diamond 306 (the user logged out) and box 312 moves to box 314 where the log file is stored. In this exemplary embodiment, the log file is made read-only for security and compressed ("zipped") to preserve space. In box 316, email is again sent to the manager. FIG. 8 illustrates the email received when the user tampered with the log file. The users name is included along with the other data, according to this exemplary embodiment.

At some time 320 (immediately, hourly, daily, etc.), the log file is sent to the manager in box 322. Processing concludes in oval 324.

According to this embodiment of this invention, log files are displayed in two ways. Turning to FIG. 9, a first log file format is shown. This log file format presents a summary of all of the logins on all of the systems that this manager monitors. Generally, this summary presents the name of the system ("HOST"), the time of the login ("LOGIN"), the time of the logout ("LOGOUT"), the user ("WHO"), the reason ("REASON") and any comments. In this manner, the manager can tell at a glance what has happened in the past time period.

Figure 10:
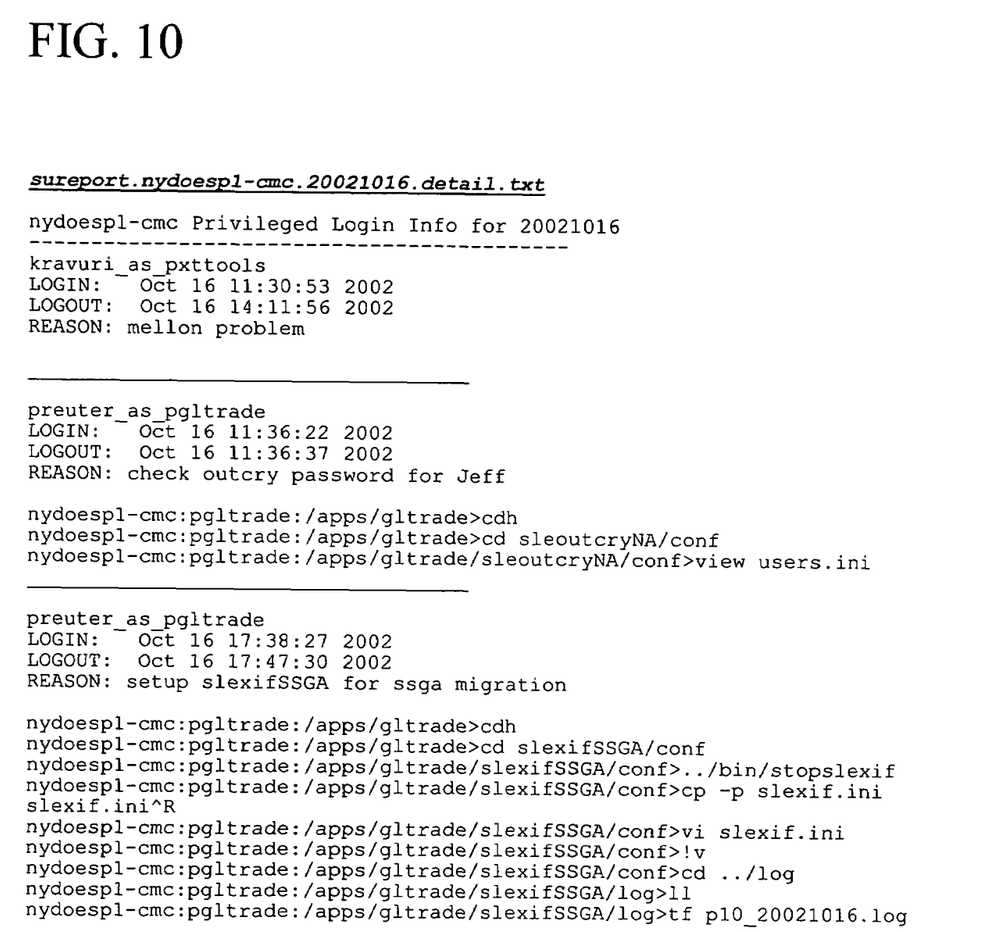
FIG. 10 is a sample of a log file according to another aspect of this invention.

Turning now to FIG. 10, a detailed log file is shown. All of the operations performed by the users are shown specifically. In this manner, the manager may trace any tampering, wrong entries, etc., and is able to take appropriate action immediately.

Advantageously, additional protections may be afforded to suwrapper configuration files and audit logs. In accordance with one exemplary embodiment of this invention, the suwrapper script is owned by root and write protected. Furthermore, suwrapper may be programmed such that, if someone attempts to run the script in the debugging mode ("-x" switch), the script immediately exits.

In accordance with other aspects of this invention, configuration files are owned by root and write protected. Log files, while owned by the user, are zipped and write protected when suwrapper exits. Further, all files that support suwrapper may advantageously be protected by the optional layered security tool called "eTrustAC" (previously called SEOS and referenced above).

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A method for allowing a user to temporarily gain access to a privileged account on a computer system to perform a maintenance task, the method being a replacement for a conventional switch user command, comprising:

receiving a switch user command login with a user id and an account name as an argument;

retrieving a list of privileged account names;

determining whether the account name is in a list of privileged account names and diverting the user to the conventional switch user command prompt if the account name is not in the privileged account list; otherwise, determining whether the user id is in a list of user ids having permission to access privileged accounts and allowing access to the account if the user id is in the list of user ids having permission to access privileged accounts;

prompting for a reason for accessing the account;

recording a reason for accessing the account;

notifying a manager of the privileged account of the login;

recording keystrokes in a log file while logged into the account;

terminating the login;

and notifying the manager of the privileged account of the login termination.

2. A method for allowing a user to temporarily gain access to a privileged account on a computer system to perform a maintenance task, the method being a replacement for a conventional switch user command, comprising:

receiving a switch user command login with a user id and an account name as an argument;

retrieving a list of privileged account names;

determining whether the account name is in a list of privileged account names and diverting the user to the conventional switch user command prompt if the account name is not in the privileged account list; otherwise, determining whether the user id belongs to a privileged group located in a group list on the computer system having permission to access privileged accounts;

denying access to privileged accounts and notifying the manager if the user id does not belong to the privileged group, otherwise, allowing;

prompting for a reason for accessing the account;

recording a reason for accessing the account;

notifying a manager by email of the access of the privileged account of the switch user login along with the name of a first log file;

recording keystrokes in the first log file while logged into the account;

recording keystrokes in a duplicate log file while logged into the account;

determining whether the first log file was tampered with and if so recording that the first log file was tampered with in the duplicate log file and transmitting the duplicate log file to the manager;

terminating the switch user login;

and notifying the manager by email of the privileged account of the switch user login termination.

3. A method in accordance with claim 2 further comprising: denying write permission to the log file after the step of terminating the login.

4. A method in accordance with claim 2 further comprising: transmitting the log file to the account manager.

5. A method in accordance with claim 2 further comprising: receiving a password in order to access the privileged account; determining whether the password associated with the user id matches the entered password; and permitting access only if the password associated with the user id matches the entered password.

6. A method in accordance with claim 2 further comprising: notifying the manager of the privileged account if the login is not successful.

7. A method in accordance with claim 2 further comprising: compressing the log file after terminating the login.

8. A method in accordance with claim 2 further comprising: deleting the duplicate log file responsive to a determination that the log file has not been tampered with.

* * * * *

UNITED STATES PATENT AND TRADEMARK OFFICE
CERTIFICATE OF CORRECTION

PATENT NO. : 7,376,838 B2  Page 1 of 1
APPLICATION NO. : 10/680400
DATED : May 20, 2008
INVENTOR(S) : Lakshmi Narayanan It is certified that error appears in the above-identified patent and that said Letters Patent is hereby corrected as shown below:

Col. 6, LN 15, change:

"allowing;" to --allowing access to the account;--

Signed and Sealed this

Sixteenth Day of September, 2008

JON W. DUDAS
*Director of the United States Patent and Trademark Office*